United States Patent
Cui et al.

(10) Patent No.: US 10,498,666 B2
(45) Date of Patent: Dec. 3, 2019

(54) SYSTEMS AND METHODS FOR ALLOCATING END DEVICE REOURCES TO A NETWORK SLICE

(71) Applicant: AT&T Intellectual Property I, L.P., Atlanta, GA (US)

(72) Inventors: Zhi Cui, Sugar Hill, GA (US); Paul Smith, Jr., Terrell, TX (US); Sangar Dowlatkhah, Alpharetta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 81 days.

(21) Appl. No.: 15/582,888

(22) Filed: May 1, 2017

(65) Prior Publication Data
US 2018/0316627 A1  Nov. 1, 2018

(51) Int. Cl.
*H04L 12/813* (2013.01)
*H04L 12/927* (2013.01)

(52) U.S. Cl.
CPC ............ *H04L 47/805* (2013.01); *H04L 47/20* (2013.01); *H04L 47/808* (2013.01)

(58) Field of Classification Search
CPC ..... H04L 47/805; H04L 47/20; H04L 47/808; H04L 41/08; H04L 41/0806; H04L 41/0869; H04L 63/20; H04W 72/10; H04W 412/08; H04W 412/12; H04W 16/04; H04W 28/06; H04W 88/14; H04W 12/06

See application file for complete search history.

(56) References Cited

U.S. PATENT DOCUMENTS

| | | | |
|---|---|---|---|
| 9,450,823 B2 | 9/2016 | Arora et al. | |
| 2015/0154258 A1 | 6/2015 | Xiong et al. | |
| 2015/0373546 A1* | 12/2015 | Haugen | H04W 12/08 726/22 |
| 2016/0352924 A1* | 12/2016 | Senarath | H04M 15/8016 |
| 2016/0353367 A1 | 12/2016 | Vrzic et al. | |
| 2016/0353465 A1* | 12/2016 | Vrzic | H04W 12/06 |
| 2017/0004156 A1 | 1/2017 | Baptist et al. | |
| 2017/0244633 A1* | 8/2017 | Krishnan | H04W 76/10 |
| 2017/0318468 A1* | 11/2017 | Aijaz | H04W 16/10 |
| 2018/0014222 A1* | 1/2018 | Song | H04W 28/0257 |
| 2018/0242304 A1* | 8/2018 | Rong | H04W 28/0247 |

(Continued)

FOREIGN PATENT DOCUMENTS

WO  WO 2015/142372 A1  9/2015
WO  WO 2017/012402 A1  1/2017

OTHER PUBLICATIONS

Chen et al.; "Software Defined Mobile Networks: Concept, Survey, and Research Directions"; IEEE Communications Magazine; 53.11; 2015; p. 126-133.

(Continued)

*Primary Examiner* — Todd L Barker
(74) *Attorney, Agent, or Firm* — BakerHostetler (57) ABSTRACT

An SDN client on an end device receives slice placement instructions relating to services to be placed on a selected slice from an SDN controller. The SDN client also receives policy input regarding allocation of resources on the end device and user preference input regarding priority of the services. A network slice is selected on which the resource will be allocated based on the slice placement instructions, the policy input, and user preference input.

14 Claims, 6 Drawing Sheets

(56) References Cited

U.S. PATENT DOCUMENTS

2019/0037409 A1* 1/2019 Wang .................... H04W 16/04

OTHER PUBLICATIONS

Lee et al.; "meSDN: Mobile Extension of SDN"; Proceedings of the $5^{th}$ Int'l Workshop on Mobile Cloud Computing & Service; 2014; 8 pages.
Li et al.; "An end-to-end network slicing framework for 5G wireless communication systems"; arXiv preprint arXiv:1608.00572; 2016; 13 pages.

* cited by examiner

SYSTEMS AND METHODS FOR ALLOCATING END DEVICE REOURCES TO A NETWORK SLICE

TECHNICAL FIELD

This disclosure relates in general to allocation of services to network slices and in particular, to allocation of end device resources to a network slice.

BACKGROUND

Mobile devices are becoming more sophisticated powerful and can provide a variety of applications with varied network demands in terms of latency, throughput, data speeds and the like. So far, mobile networks (of up to 4G), mainly serving mobile phones, have been optimized primarily for phones. The next generation of mobile networks beyond the 4G LTE mobile networks of today (5G networks) are expected to provide ultra-high radio speed (20 Gbps/UE); ultra-low latency (E2E in msec); and massive connectivity. 5G networks will have to serve a variety of devices with different characteristics and needs. Some of the most mentioned use cases for 5G networks are mobile broadband, massive internet of things (IoT), and mission-critical IoT, and they all require different types of features and networks in terms of mobility, charging, security, policy control, latency, reliability, etc. For example, a massive IoT service that connects stationary sensors measuring data such as temperature, humidity, precipitation, etc. will not require features like handover or location update, which have been critical in serving mobile phones. Alternately, a mission-critical IoT service (like autonomous driving or remote controlled robots) requires a substantially low end to end (E2E) latency of less than a ms. These different requirements can be accommodated by dynamic network slicing. Network slicing capitalizes on the capability of software defined networking (SDN), network function virtualization (NFV) orchestration comment analytics. In 5G mobile networks, network slicing will allow operators to design, deploy, and customize different "slices" of the network, running on a common network infrastructure. Each slice will have independent characteristics for best delivering a particular service type and sharing resources between services and slices. Network slicing will allow telecom operators to provide networks on an as-a-service basis and meet the wide range of use cases. Thus, in a single 5G system, network slicing technology can provide connectivity for smart meters with a network slice that connects "internet of things" devices with a high availability and high reliability data-only service, with a given latency, data rate and security level. At the same time, the technology can provide another network slice with very high throughput, high data speeds and low latency for an augmented reality service.

The object of slicing in general is to use virtualization technology to architect, partition and organize computing and communication resources of a physical infrastructure to enable flexible support of diverse use case realizations. With network slicing, one physical network is sliced into multiple virtual networks, each architected and optimized for a specific requirement and/or specific application/service. A network slice is self-contained in terms of operation and traffic flow and can have its own network architecture, engineering mechanisms and network provision.

Smart mobile devices integrated into a 5G network will be able to support existing and emerging types of applications with diverged service requirements and spectrum bands (e.g. existing cellular band such as 700 mHz, and new 5G high frequency bands for mmW), etc. To meet such diverged requirements improving smart mobile device efficiency is very important. Virtualization and slicing network resources for different types of services to allow all services sharing the same network resources, yet with some partitions that most efficiently deploy resources for each slice.

Current industry efforts mainly focus on network slicing including e.g. RAN and core in the mobility network. Some efforts also look at the user equipment (UE) slicing, but focuses on placing service(s) on proper slice of the mobile network based on different type of services and operator policy.

There is a need to extend the slicing concept to the end device and provide dynamic device resource allocation/re-allocation, including radio resource, processing, memory, battery, etc. on each slice based on applications, network SDN control, user/network policy (e.g. service priority, etc.), and real time device resource utilization of each slice. There is a need to better utilize the device resources.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of allocating a resource of an end device to one of a plurality of network slices including: receiving in a client on the end device slice placement instructions from an SDN controller relating to services to be placed on a selected slice from the plurality of network slices; receiving in the client on the end device policy input regarding allocation of the resource on the end device; receiving user preference input regarding priorities of the services; selecting a selected network slice from the plurality of network slices on which the resource will be allocated based on the slice placement instructions, the policy input, and user preference input; and allocating the resource to the selected network slice. Other embodiments of this aspect include corresponding computer systems, apparatus, and computer programs recorded on one or more computer storage devices, each configured to perform the actions of the methods.

Embodiments of the system extend the slicing concept to the end device and provides dynamic device resource allocation/re-allocation including radio resource, processing, memory, battery, etc. on each slice based on applications, network SDN control, user/network policy (e.g. service priority, etc.), and real time device resource utilization of each slice. One general aspect includes a system including an end device having a processor. The system also includes a memory coupled to the processor. The system also includes a receiver configured to receive instructions from an SDN controller and an operator policy server in a network. The system also includes a plurality of end device resources and an SDN client module where the memory stores instructions, which when executed by the processor, cause the processor to perform the steps of: receiving at the SDN client module instructions from the SDN controller relating to services to be placed on a selected slice from a plurality of network slices. The instructions also include receiving at the SDN client policy input regarding allocation of the resource on the end device and receiving user preference input regarding priorities of the services. The instructions also include selecting a selected network slice from the plurality of network slices on which the resource will be allocated based on the slice placement instructions, the policy input, and user preference input and allocating the resource to the selected network slice. Other embodiments of this aspect include corresponding computer systems, apparatus, and computer programs recorded on one or more computer storage devices, each configured to perform the actions of the methods.

One general aspect includes a computer readable media, including program instructions executing on a computer, for allocating resources in an end device to one of a plurality of network slices, the program instructions including instructions for performing the steps of: receiving in a client on the end device slice placement instructions from an SDN controller relating to services to be placed on a selected slice from the plurality of network slices; receiving in the client on the end device policy input regarding allocation of the resource on the end device; receiving user preference input regarding priorities of the services; selecting a selected network slice from the plurality of network slices on which the resource will be allocated based on the slice placement instructions, the policy input, and user preference input; and allocating the resource to the selected network slice. Other embodiments of this aspect include corresponding computer systems, apparatus, and computer programs recorded on one or more computer storage devices, each configured to perform the actions of the methods.

DETAILED DESCRIPTION OF ILLUSTRATIVE EMBODIMENTS

Figure 1:
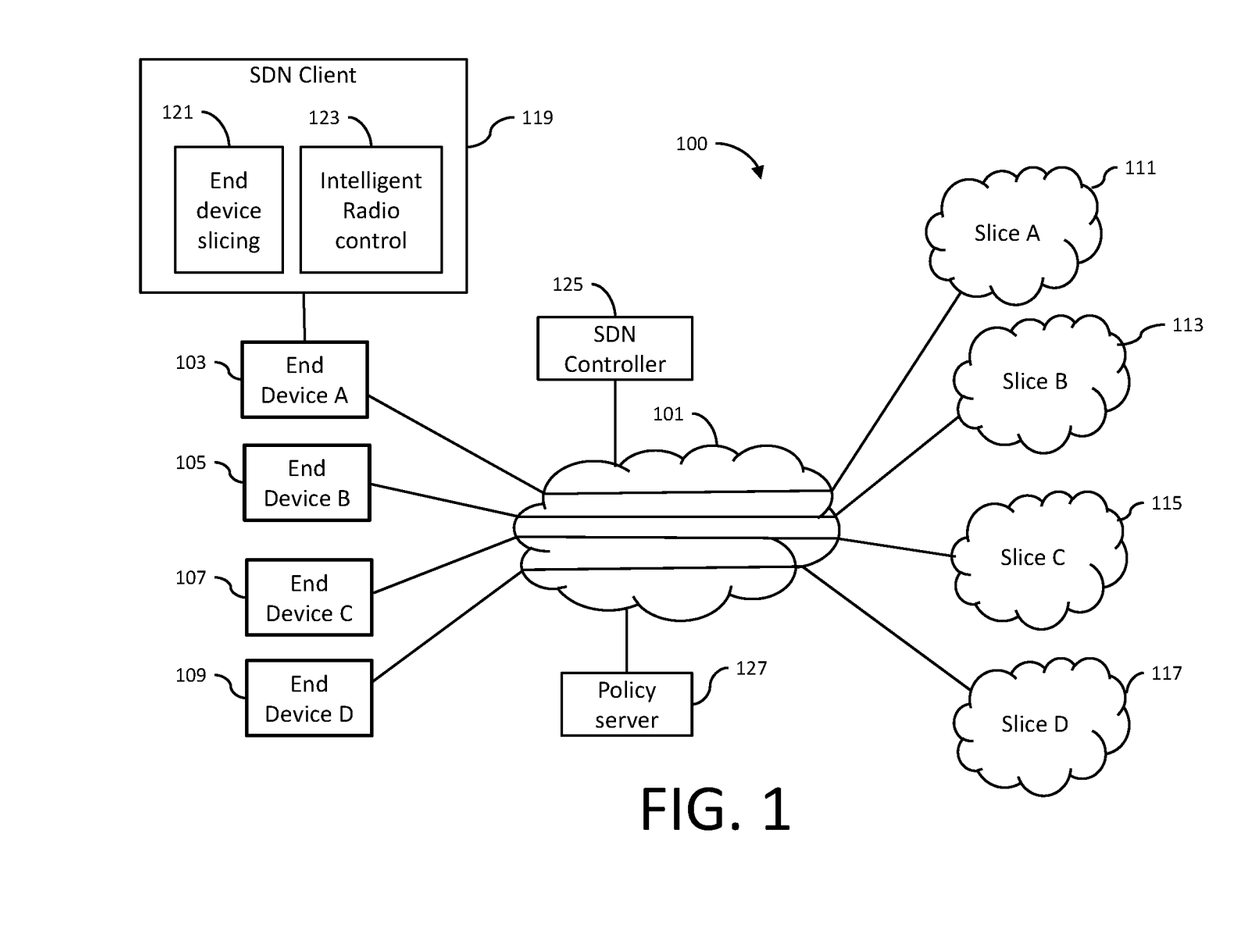
FIG. 1 is a block diagram of the network architecture in which the system of the present disclosure operates

Illustrated in FIG. 1 is a 5G network architecture 100 including a 5G network 101 connected to a plurality of end devices, for example end device A 103, end device B 105, end device C 107 and end device D 109. End device A may be any one of a variety of end devices such as mobile device, computer, an Internet of things (IoT) device and the like. Each end device may have a particular use case, for example end device A 103 may be used for autonomous vehicle control which may require very low latency, and high availability and reliability. Alternately end device B may be used for delivery of media on demand requiring high user throughput, a slightly higher latency requirements and a slightly lower availability requirement. Each end device may be supported by a separate network slice, for example end device A 103 may be supported by network slice A 111, end device A 105 may be supported by network slice B 113, end device A 107 may be supported by network slice C 115, and end device D 109 may be supported by network slice D 117. The technique of network slicing allows for the definition of multiple logical networks (or slices) on top of the same physical infrastructure. Resources can be dedicated exclusively to a single slice or shared between different slices. There are different types of resources such as computing, storage, access equipment, transport, VNFs, and so on. A network slice is built to address a desired behavior from the network. Such behavior can be associated with security, data-flow isolation, quality of service, reliability, independent charging and so on. A network slice may support one or many services, and can be used to create a virtual operator network and may provide customized service characteristics. Network slicing can be used for several purposes: a complete private network, a copy of a public network to test a new service, or a dedicated network for a specific service. The end devices, such as for example end device A 103 may be provided with an SDN client 119 having a plurality of applications, including an end device slicing application 121 and an intelligent radio control application 123. An SDN controller 125 and a policy server 127 may be provided in the 5G network 101 to provide slice placement instructions and resource policy input to the end devices 103 through 109.

Figure 2:
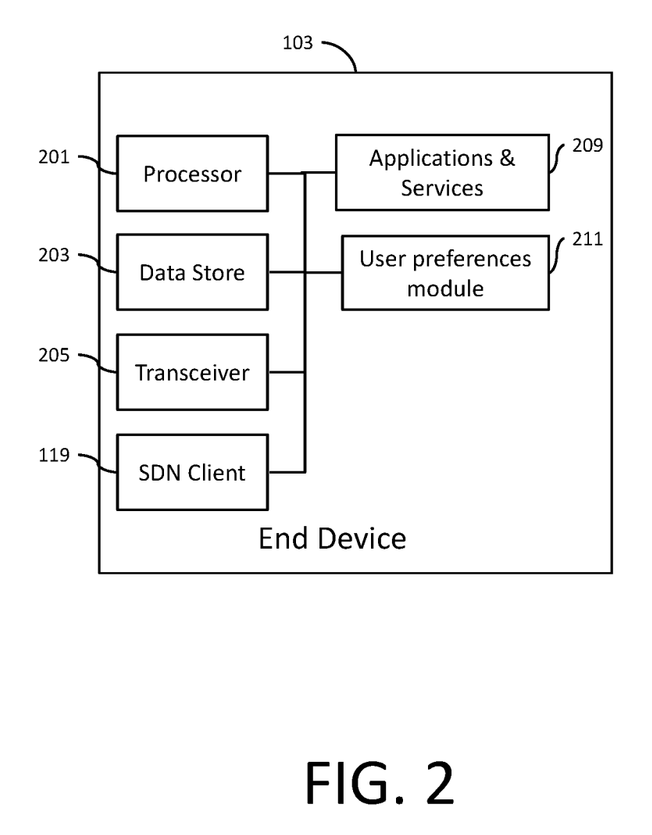
FIG. 2 is a block diagram of an end device.
Figure 3:
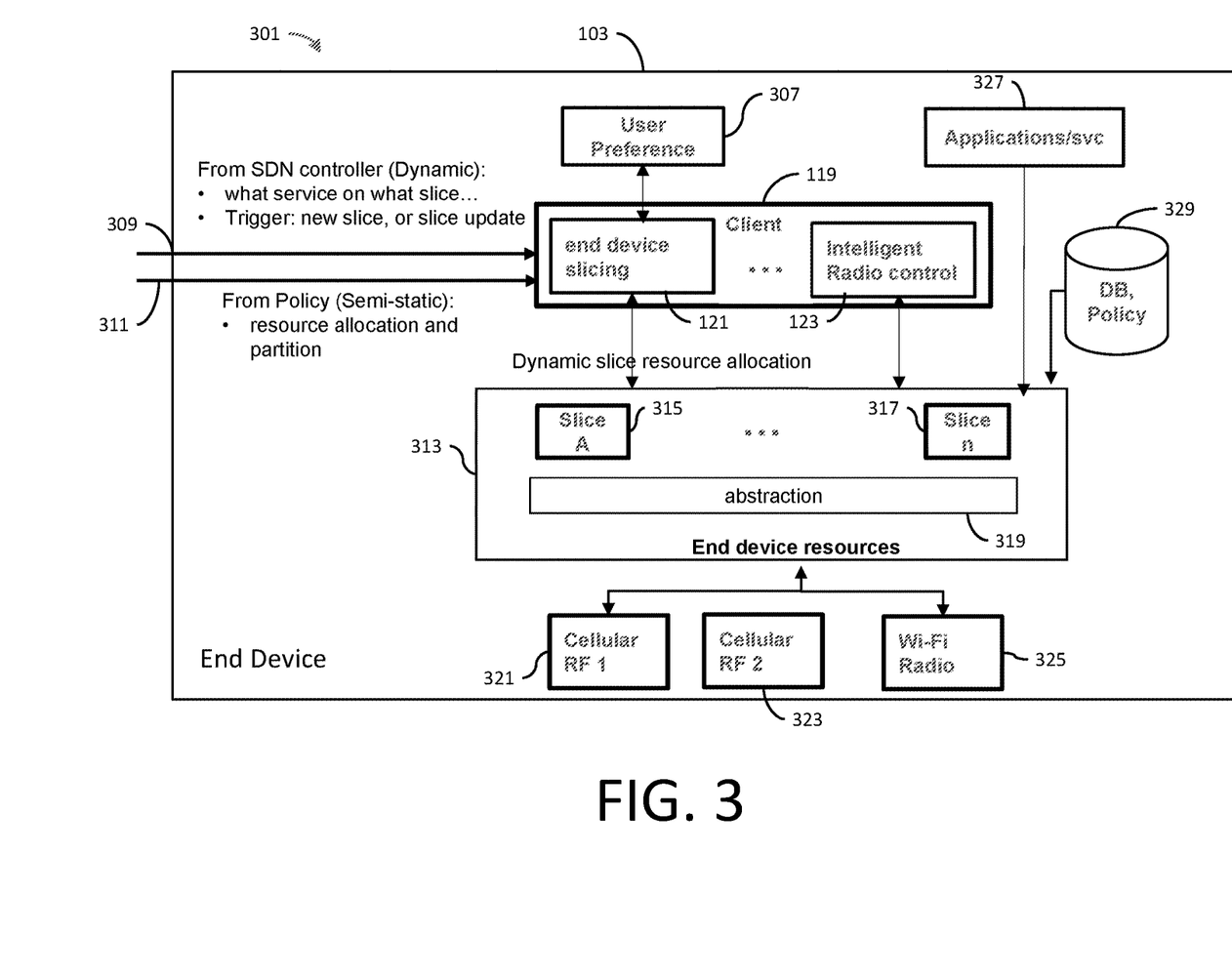
FIG. 3 is a block diagram illustrating a system for controlling end device resources based on resource slicing.

Illustrated in FIG. 2 is a block diagram of a typical end device such as end device A 103. End device 200 may include a processor 201, a data store 203, a transceiver 205, an SDN client 119 a set of application and services 209 that are executed by the processor 201 and a user preferences module 211. The end device A 103 may be a mobile device, a computer, a laptop, a PDA, an IoT device, FIG. 3 is a block diagram illustrating an exemplary solution of end device resource allocation system 301 where the allocation is made by a network slice. End device A 103 may include an SDN client 119 that may include an end device slicing application 121 and an intelligent radio control application 123.

SDN client 119 receives slice placement instructions 309 from SDN controller (not shown). The slice placement instructions 309 tell the end device A 103 what service should be running on which slice. The trigger for device receiving the slice placement instructions 309 from the SDN controller may be the introduction of a new slice or a new service or changes with regards to what service will run on which slice. The slice placement instructions 309 may be updated when a new slice is created or when slice change occurs that is relevant to the end device.

The SDN client 119 may also receive resource policy input 311 from a policy server (not shown) in the network regarding how end device resource e.g. radio resource, processing, memory, battery, etc. should be allocated and partitioned on each slice, what are the thresholds, etc. This can be semi-static, static, or dynamic. In an alternate embodiment, a resource policy may be stored in a database stored in data store 329 (policy store) in the end device A 103 and the resource policy input may originate from the database stored in data store 329. In an alternate embodiment the resource policies may be learned/trained.

The SDN client 301 may also be provided with user preferences from a user preference module 307 that may provide priorities of services which could impact the decision of the resource allocation. For example the user of a device may care most about its streaming video experience for the super bowl on the game day. The user can indicate that via an API. Then the slicing agent at the device makes sure all the resources on the device are properly allocated to this application at the game time.

Based on the slice placement instructions 309, the resource policy input 311 and input from the user preferences module 307, the SDN client 301 decides dynamically how to partition resources on the end device 200 and to allocate or reallocate resources, for example radio resources, processing resources, memory resources, battery resources, etc. on each slice and/or different access networks (e.g. Wi-Fi, LTE, and 5G). These decisions are made on per service or service category granularity based on the application, quality of experience, etc.

The end device slicing application 121 receives as inputs the slice placement instructions 309, the resource policy input 311 and the user preference module 307 and decides the resource allocation for the slice.

The resources are allocated to each slice from the end device resource pool based on the resource allocation decision mentioned above. Various slices (e.g. slice A 315 through slice n 317) share the resources in the common resource pool via the use of an abstraction layer 319. The abstraction hides the physical resource pool from each slice, such that each slice only see the resource allocated to it. End device resource tool 313 depicts the end device resources. Below the abstraction are the physical resources (not drawn in the picture), e.g. compute, memories, radio, etc. Above the abstraction layer are the resources allocated to each slice. The resources allocated to the slices share the same physical resources below the abstraction layer. End device resource tool 313 places the applications/services over the associated slice, The end device resource tool 313 dynamically fine tunes end device resource allocation in real time according to user policy, SDN controller input, and resource utilization, such as device processing/compute utilization of each slice, service demand, service priority, etc.

The intelligent radio control application 123 provides input to the end device resource tool to enable the selection of a radio access technology such as a first cellular radio frequency 321, a second cellular radio frequency 323, WiFi radio 325, etc., or dynamically turn on/off a radio (e.g. Wi-Fi, or one or more high frequency band(s) in 5G) depending on battery condition or mobility state.

The SDN client 301 may use closed loop feedback (with regard to resource utilization) to dynamically adjust end device resource on each slice.

Figure 4:
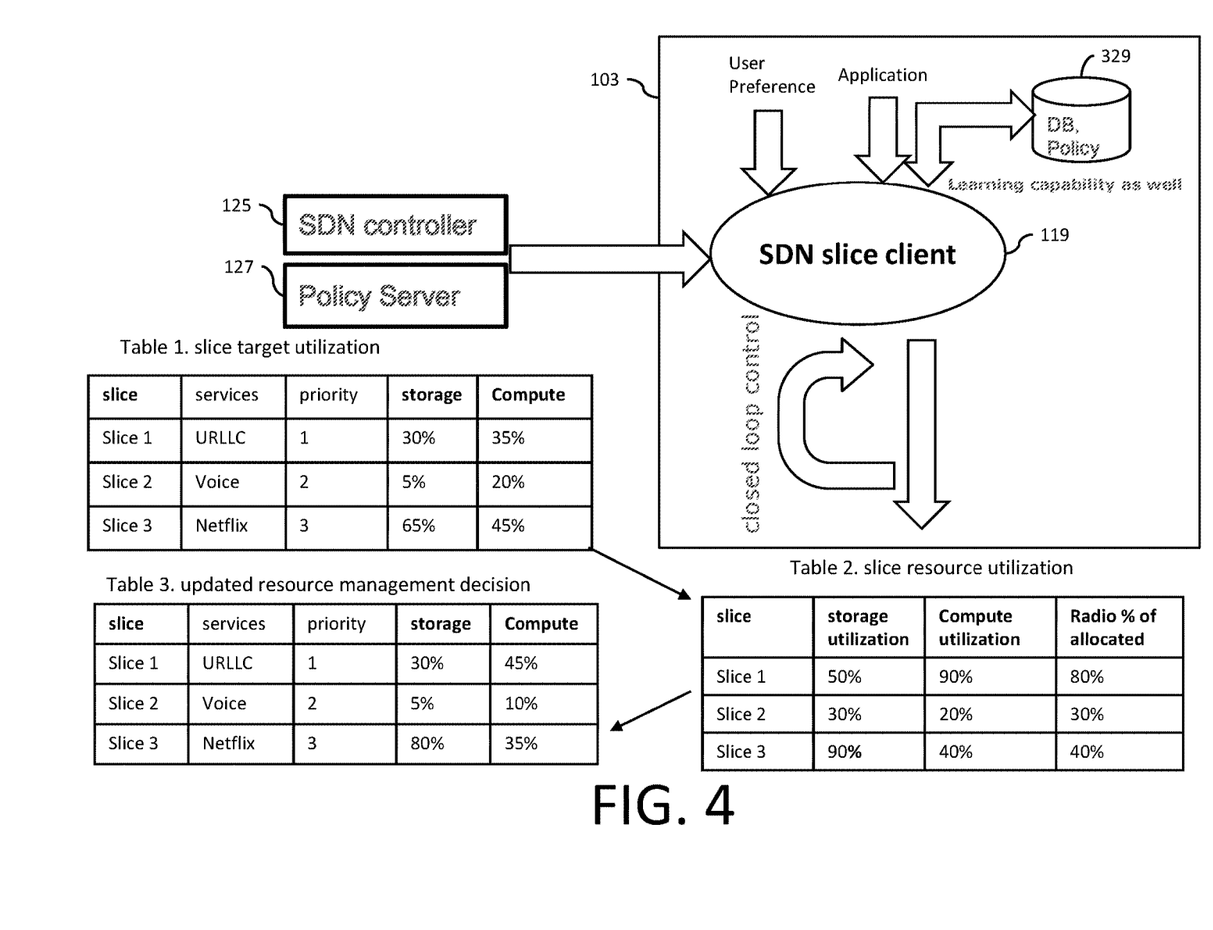
FIG. 4 is a block diagram illustrating how resources of the end device may be controlled based on resource slicing.

FIG. 4 illustrates storage and compute resource allocations based on slice target utilization and slice resource utilization. As shown in table 1 in FIG. 4, SDN controller 125 provides placement instruction to the effect that ultra-reliable-low latency communications are allocated to the first slice with a priority of 1 with the allocation of 30% of the storage resources and 35% of the compute resources. Voice communications are allocated to the second slice with a priority of 2, and an allocation of 5% of the storage resources and 20% of the compute resources. Netflix (video) is allocated to the third slice, with a priority of 3 and an allocation of 65% of the storage resources and 45% of the compute resources. Policy server 127 indicated if the compute resource were allocated to the applicable slice. Table 2 illustrates the actual resource utilization of the end device 103. For example, in the first slice there is 50% of the allocated storage is being used utilized (i.e. 50% of storage utilization), 90% compute utilization, and 80% of the radio resource utilization for the given slice. In the second slice there is 30% storage utilization, 20% compute utilization and 30% of the radio bandwidth has been allocated. Finally in the third slice there is 90% storage utilization 40% compute utilization and 40% of the radio bandwidth has been allocated. The SDN client 119 and provides an updated resource management decision which is illustrated in table 3. In the first slice in table 3 the compute resources has been increased to 45% because the compute utilization shown in table 2 is at a high 90% and the resource management decision is to increase the dedicated compute resources in slice 1 to accommodate the high utilization reflected in table 2. In the second slice the compute resources of been decreased to 10% because of the relatively low compute utilization reflected in table 2 for slice 2. And finally, in the third slice storage resources have been increased to 80% and the compute resources of been decreased to 35% to accommodate the high storage utilization (90% in table 2) and the lower compute utilization (40% in table 2).

Figure 5:
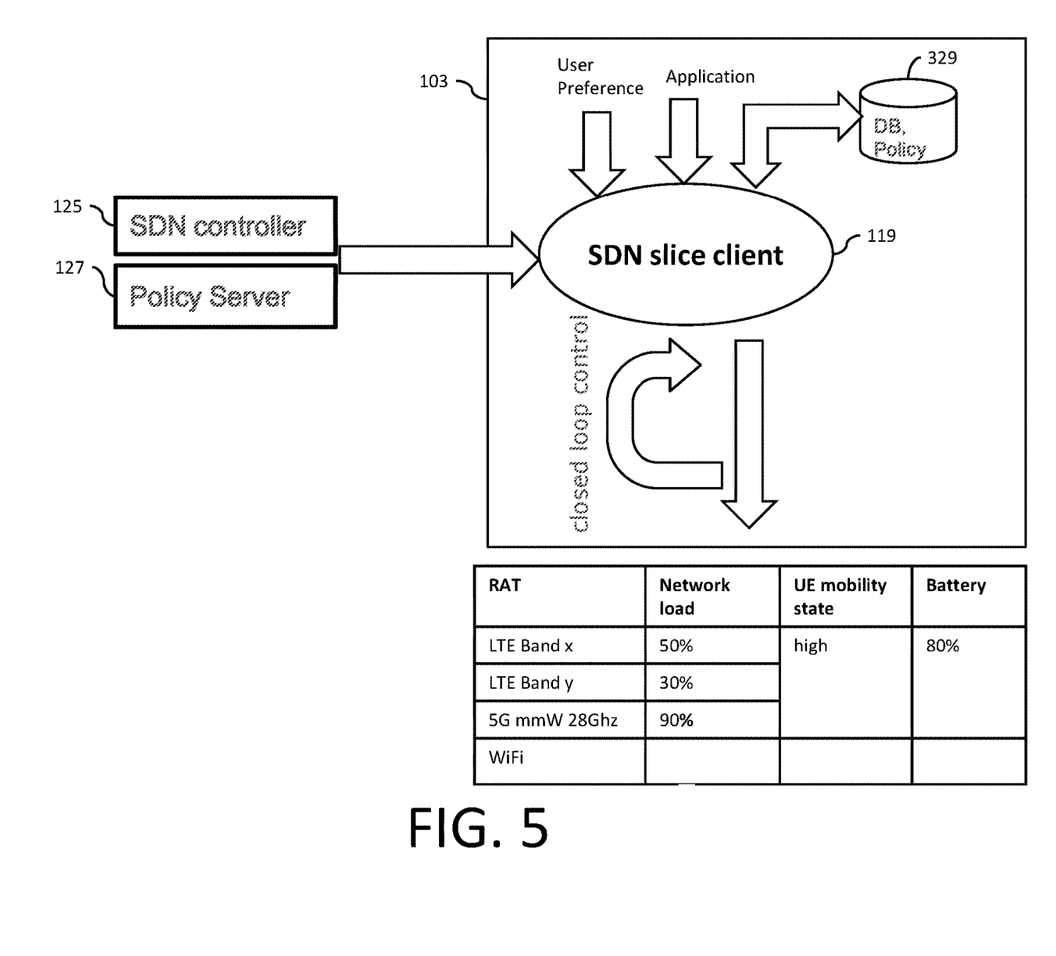
FIG. 5 is a block diagram illustrating how resources of the end device may be controlled based on resource slicing.

As shown in FIG. 5 the SDN client 119 can make additional intelligent decisions, e.g. regarding on battery and energy saving optimization of the device especially to meet 5G requirements and improve end user experience. For example, if the UE mobility state is high WiFi and 5G mmW 28 Ghz are not useful radio access technologies and may be turned off to save battery resources. If the network load for a particular radio access technology is high (e.g. 5G mmW 28 Ghz at 90%) then that radio access technology may be turned off to save battery resources.

Figure 6:
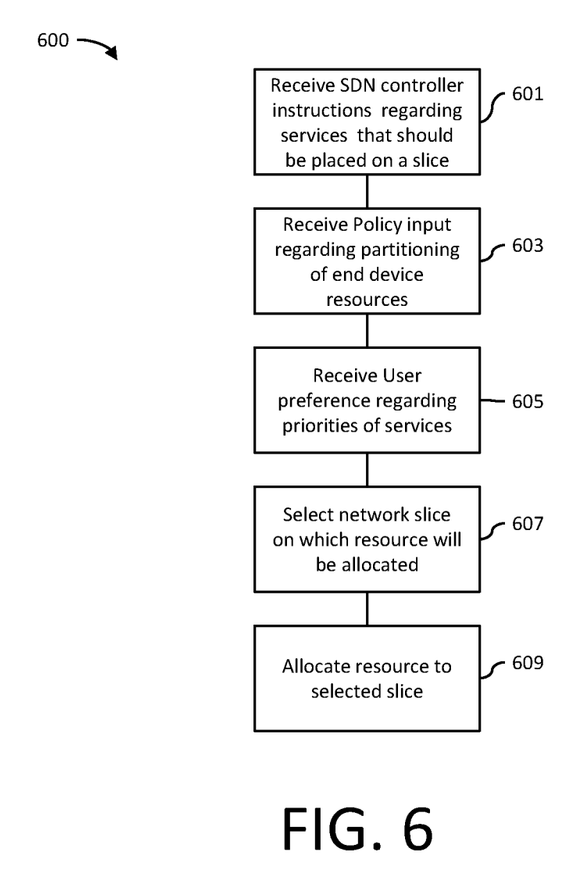
FIG. 6 is a flowchart of a method for allocating end device resources to a network slice.

FIG. 6 is a flowchart of a method 600 for allocating resources in an end device based upon the characteristics of network slices.

In step 601 an SDN client on an end device receives slice placement instructions from an SDN controller relating to services to be placed on a selected slice from the plurality of network slices. This may be triggered by a new slice or a slice update on the network.

In step 603 the SDN client on the end device receives policy input regarding allocation of the resource on the end device. The resources may include radio resources, processing resources, memory resources, and battery resources. The policy input may be provided by a policy server on the network, or a data store in the end device.

In step 605 the SDN client receives user preference input regarding user priorities of the services.

In step 607 a selected network slice on which the resource will be allocated is selected based on the slice placement instructions, the policy input, and user preference input.

In step 609 the resource is allocated to the selected network slice.

The method 600 may also include a closed loop feedback with regard to resource utilization to dynamically adjust the end device resources on the selected network slice and making additional intelligent decisions to meet network requirements and improve user experience.

As described above, the exemplary embodiments can be in the form of processor-implemented processes and devices for practicing those processes, such as a server in a regional network or cloud data center. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer readable media or computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed:

1. A method of allocating a resource of an end device to a selected network slice comprising:
   receiving at a slicing application in a software defined network client on the end device, slice placement instructions from a software defined network controller, relating to services to be placed on each of a plurality of network slices wherein the slice placement instructions tell the end device what services should be running on which slice;
   receiving at the slicing application in the software defined network client on the end device, policy input from a policy server regarding how the resource of the end device should be allocated and partitioned on each of the plurality of network slices and wherein the resource of the end device allocated to each slice is derived from an end device resource pool based on a computation from the slicing application and wherein slices share the resources in the resource pool via the utilization of an abstraction layer that hides the physical resource pool from each slice, such that each slice only sees the resource allocated to it,
   dynamically fine tuning, in a resource tool, allocation of the resource of the end device in real time according to a user policy, SDN controller input and resource utilization, service demand, and service priority;
   wherein the resource comprises a selected resource selected from among a group comprising radio resource, processing resource, memory resource, and battery resource;
   receiving at the slicing application in the software defined network client, user preference input regarding priorities of the services;
   selecting, using the slicing application, the selected network slice on which the resource will be allocated based on the slice placement instructions from the software defined network controller, the policy input from the policy server, and the user preference input;
   allocating the resource to the selected network slice;
   using a closed loop feedback with regard to resource utilization to dynamically adjust the resource on the selected network slice; and
   selecting a radio access technology using an intelligent radio control application in the software defined network client.

2. The method of claim 1 further comprising the end device making additional intelligent decisions to meet network requirements.

3. The method of claim 1 further comprising the end device making additional intelligent decisions to improve user experience.

4. The method of claim 1 wherein the slice placement instructions are triggered by a new slice or a slice update.

5. The method of claim 1 wherein the policy input is generated by a policy store in the end device.

6. A system comprising:
   an end device comprising:
      a processor;
      a memory coupled to the processor
      a receiver configured to receive instructions from a software defined network controller and an operator policy server in a network;
      a software defined network client module;
   wherein the memory stores instructions, which when executed by the processor, cause the processor to perform the steps of:
      receiving at a slicing application in the software defined network client module, slice placement instructions from the software defined network controller relating to services to be placed on each of a plurality of network slices wherein the slice placement instructions tell the end device what services should be running on which slice;
      receiving at the slicing application in the software defined network client module, from a policy server, policy input regarding how the resource of the end device should be allocated and partitioned on each of the plurality of network slices and wherein the resource of the end device allocated to each slice is derived from an end device resource pool based on a computation from the slicing application and wherein slices share the resources in the resource pool via the utilization of an abstraction layer that hides the physical resource pool from each slice, such that each slice only sees the resource allocated to it,
      dynamically fine tuning, in a resource tool, allocation of the resource of the end device in real time according to a user policy, SDN controller input and resource utilization, service demand, and service priority;
      wherein the resource comprises a selected resource selected from among a group comprising radio resource, processing resource, memory resource, and battery resource;
      receiving at the slicing application in the software defined network client module, user preference input regarding priorities of the services;
      selecting, using the slicing application, a selected network slice from the plurality of network slices on which the resources will be allocated based on the slice placement instructions from the software defined network controller, the policy input from the policy server, and user preference input;
      allocating the resources to the selected network slice;
      using a closed loop feedback with regard to resource utilization to dynamically adjust the resource on the selected network slice; and
      selecting a radio access technology using an intelligent radio control application in the software defined network client module.

7. The system of claim 6 comprising additional instructions which when executed by the processor, cause the processor to perform the steps of making additional intelligent decisions to meet network requirements.

8. The system of claim 6 comprising additional instructions which when executed by the processor, cause the processor to perform the steps of making additional intelligent decisions to meet to improve user experience.

9. The system of claim 6 wherein the slice placement instructions are triggered by a new slice or a slice update.

10. The system of claim 6 wherein the policy input is generated by a policy store in the end device.

11. A non-transitory tangible computer readable media, including program instructions executing on a computer, for allocating resources in an end device to one of a plurality of network slices, the program instructions including instructions for performing the steps of:

receiving at a slicing application in a software defined network client on the end device, slice placement instructions from a software defined network controller relating to services to be placed on each of the plurality of network slices wherein the slice placement instructions tell the end device what services should be running on which slice;

receiving at the slicing application in the software defined network client on the end device, policy input from a policy server regarding how the resource of the end device should be allocated and partitioned on each of the plurality of network slices and wherein the resource of the end device allocated to each slice is derived from an end device resource pool based on a computation from the slicing application and wherein slices share the resources in the resource pool via the utilization of an abstraction layer that hides the physical resource pool from each slice, such that each slice only sees the resource allocated to it, dynamically fine tuning, in a resource tool, allocation of the resource of the end device in real time according to a user policy, SDN controller input and resource utilization, service demand, and service priority;

wherein the resource comprises a selected resource selected from among a group comprising radio resource, processing resource, memory resource, and battery resource;

receiving at the slicing application user preference input regarding priorities of the services;

selecting using the slicing application a selected network slice from the plurality of network slices on which the resource will be allocated based on the slice placement instructions from the software defined network controller, the policy input from the policy server, and the user preference input;

allocating the resource to the selected network slice;

using a closed loop feedback with regard to resource utilization to dynamically adjust the resource on the selected network slice; and selecting a radio access technology using an intelligent radio control application in the software defined network client.

12. The non-transitory tangible computer readable media of claim 11 further comprising instructions for performing the step of making additional intelligent decisions to meet network requirements.

13. The non-transitory tangible computer readable media of claim 11 further comprising instructions for performing the step of making additional intelligent decisions to improve user experience.

14. The non-transitory tangible computer readable media of claim 11 wherein the slice placement instructions are triggered by a new slice or a slice update.

* * * * *